United States Patent
Tsai

(10) Patent No.: US 6,486,978 B1
(45) Date of Patent: Nov. 26, 2002

(54) IMAGE-SCANNING MODULE FOR DOWNSIZING IMAGE-SCANNING DEVICES

(75) Inventor: Jenn-Tsair Tsai, Taipei Hsien (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/383,817

(22) Filed: Aug. 26, 1999

(30) Foreign Application Priority Data

Dec. 11, 1998 (TW) ...................................... 87220720 U

(51) Int. Cl.[7] .................................................. H04N 1/04
(52) U.S. Cl. ........................ 358/475; 358/483; 358/497
(58) Field of Search ................................ 358/475, 509, 358/483, 497, 505, 474; 250/208.1; 399/220; 362/217

(56) References Cited

U.S. PATENT DOCUMENTS

| | | | | |
|---|---|---|---|---|
| 5,768,663 A | * | 6/1998 | Lin | 399/220 |
| 5,950,053 A | * | 9/1999 | Lin | 399/220 |
| 6,046,826 A | * | 4/2000 | Lu et al. | 358/475 |

* cited by examiner

Primary Examiner—Cheukfan Lee
(74) Attorney, Agent, or Firm—Ladas & Parry

(57) ABSTRACT

An image-scanning module for downsizing the scanners is disclosed. The light-radiating device in the image-scanning module is disposed perpendicular to the plane where the scanned object is placed, thereby preventing the reflected light path from being masked by the extended portions of the light-radiating device. Consequently, a shorter light-radiating device (lighting tube) can be used, thereby downsizing the image-scanning devices.

5 Claims, 7 Drawing Sheets

IMAGE-SCANNING MODULE FOR DOWNSIZING IMAGE-SCANNING DEVICES

BACKGROUND OF THE INVENTION

1. Field of the Invention

The present invention relates in general to an image-scanning module. More specifically, it relates to an image-scanning module for downsizing image-scanning devices such as scanners.

2. Description of the Related Art

FIG. 1 shows an image-scanning device of the prior art, which comprises a light-radiating device 14 and a focusing-and-imaging device 16. The light-radiating device 14 may be a cold-cathode tube having a straight line tube 142 and two connecting heads 144 at its ends. The focusing-and-imaging device 16 may consist of a lens set.

The light-radiating device 14 moves with respect to an object 10 which is, for example, a piece of paper or a picture, along a scanning path as indicated by arrow A. The object 10 reflects the light emitted by the light-radiating device 14, as indicated by arrows B. The focusing-and-imaging device 16 then focuses an image of the reflected light onto the image-receiving device 12 as indicated by arrow C. For instance, the image-receiving device 12 may be a charge-coupled device (CCD).

In general, the light emitted from a straight-line light tube is nonuniform. The light intensity emitted from the center of a straight-line tube is stronger than that from the two ends, and thus the luminance at the center of the scanning central line is greater than that at the two ends of the scanning central line. Consequently, the image received by the charge-coupled device suffers distortion, thereby reducing the signal accuracy and scanning quality.

FIG. 2 shows a luminance characteristic curve of a conventional straight-line light tube. In FIG. 2, the length of the straight-line light tube 30 is L, and the luminance values at both ends of the straight-line light tube 30 (segments L2 and L3) drop dramatically. Therefore, only the luminance values in the L1 segment are even and effective (available) for scanning. Because the straight-line tube has the luminance characteristics as shown in FIG. 2, a straight-line tube longer than the actual scanning width is used to provide a sufficiently long effective scanning segment, thereby increasing the size of the scanner. For instance, the length of a straight-line tube (L) is about 262 mm generally, while the length of the effective portion (L1) is about 226 mm. Thus, a straight-line tube of length 262 mm is needed to scan an object of maximal length 226 mm. This restriction is an obstacle to downsizing the scanners.

Lighting tubes as depicted in FIGS. 3(a)~3(d) have been proposed to overcome the problems of the insufficient luminance at both ends of the straight-line tubes. Each of the tubes as depicted in FIGS. 3(a)~3(d) comprises a first lighting portion of straight-line shape and two second lighting portions extended from both ends of the first lighting portion. In FIGS. 3(a)~3(c), the first lighting portion and the two second lighting portions are straight-line shaped, and each of the two second lighting portions is at a specific angle to the first lighting portion. In FIG. 3(d), each of the two lighting portions is U-shaped.

The weak luminance at both ends of each of the first lighting portion (equivalent to a straight-line tube) can be compensated by the two second lighting portion.

FIG. 4 shows an image-scanning device using the lighting tube depicted in FIG. 3(a) as a light-radiating device. The lighting tubes 38 is disposed in parallel with a scanned object 32. The scanned object 32 reflects the light emitted by the lighting tube 38, as indicated by arrows D. The focusing-and-imaging device 36 then focuses an image of the reflected light onto the charge-coupled device 34. The notation LS is the width of a scanning line. In FIG. 4, the lighting tube 38 is arranged in parallel with the scanned object 32. Therefore, the length of the lighting tube 38 (equivalent to the length of the straight-line portion) must be longer than the width of the scanning line LS in order to prevent the reflected light path D from being masked by the L-shaped portions extended from both ends of the straight-line portion of the lighting tube 38. Specifically, the L-shaped portions easily mask the reflected light path D when the lighting tube 38 is disposed close to the scanned object. Thus, the scanner is still bulky due to the restriction on the lengths of the lighting tubes.

SUMMARY OF THE INVENTION

Therefore, an object of the present invention is to provide an image-scanning module for downsizing the scanners. The light-radiating device (lighting tube) in the image-scanning module is disposed perpendicular to the plane where the scanned object is placed, thereby preventing the reflected light path from being masked by the extended portions of the light-radiating device. Consequently, a shorter lighting tube can be used, thereby downsizing the image-scanning devices.

In order to achieve the above object, an image-scanning module for downsizing a scanner comprises at least the following units.

A light-radiating device for emitting light to scan an object, comprising a first lighting portion and two second lighting portions extended from two ends of the first lighting portion; wherein the first lighting portion and the two second lighting portions are on the same plane.

A focusing-and-imaging device for focusing the reflected light from said scanned object and for forming an image.

An image receiving device for receiving and processing said image.

The light-radiating device is disposed in a way that the plane formed by the first lighting portion and the two second lighting portions is perpendicular to the plane where the scanned object is placed, whereby the reflected light from said scanned object is not masked by the two lighting portions and the length of first lighting portion can be reduced, thereby downsizing the scanner.

BRIEF DESCRIPTION OF THE DRAWINGS

The following detailed description, given by way of example and not intended to limit the invention solely to the embodiment described herein, will best be understood in conjunction with the accompanying drawings, in which.

DETAILED DESCRIPTION OF THE PREFERRED EMBODIMENTS

Figure 1:
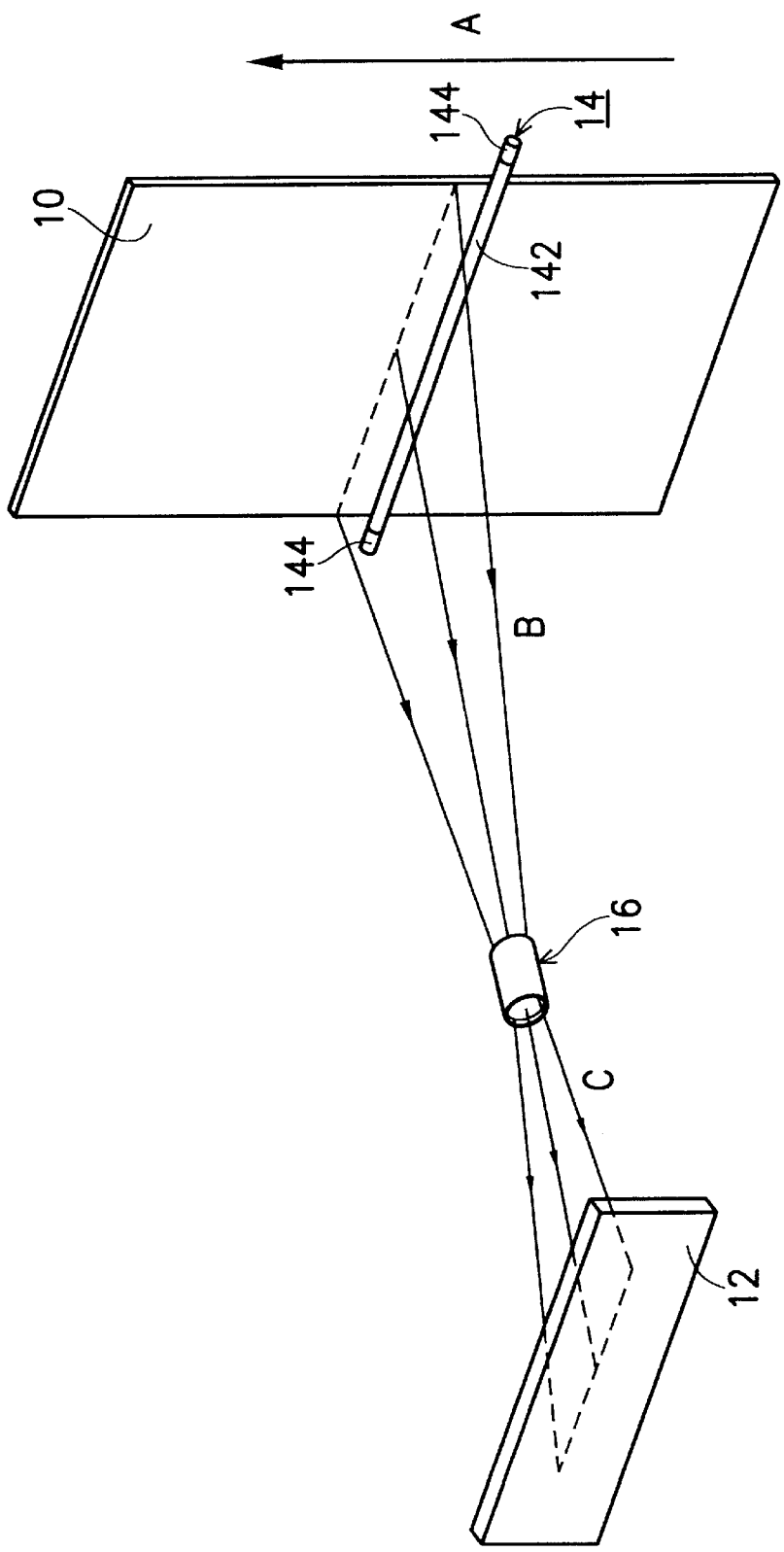
FIG. 1 shows an image-scanning device of the prior art.
Figure 2:
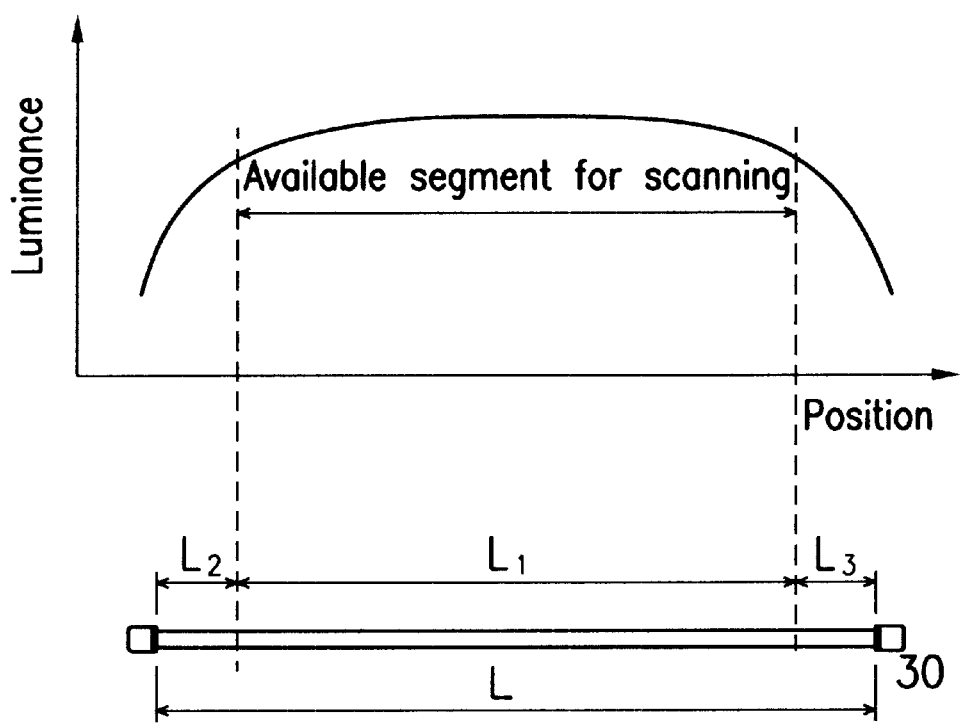
FIG. 2 shows a luminance characteristic curve of a straight-line light tube.
Figure 3A:
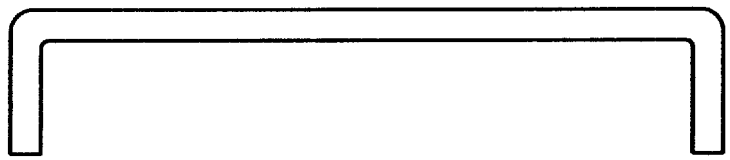
FIG. 3(a) to FIG. 3(b) show lighting tubes for compensating the luminance at both ends of straight-line tubes.
Figure 3B:
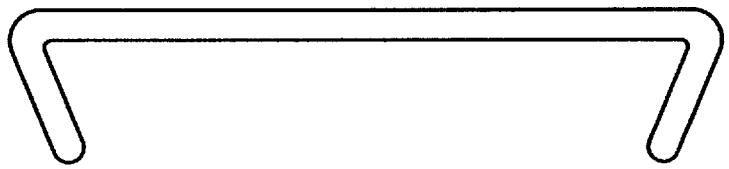
Figure 3C:
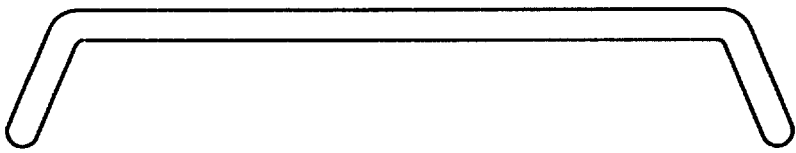
Figure 3D:
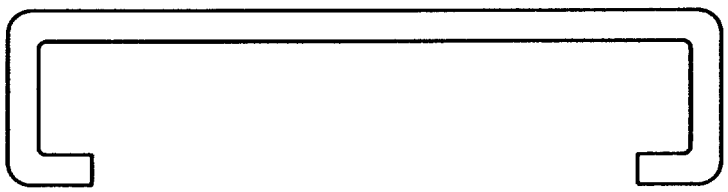
Figure 4:
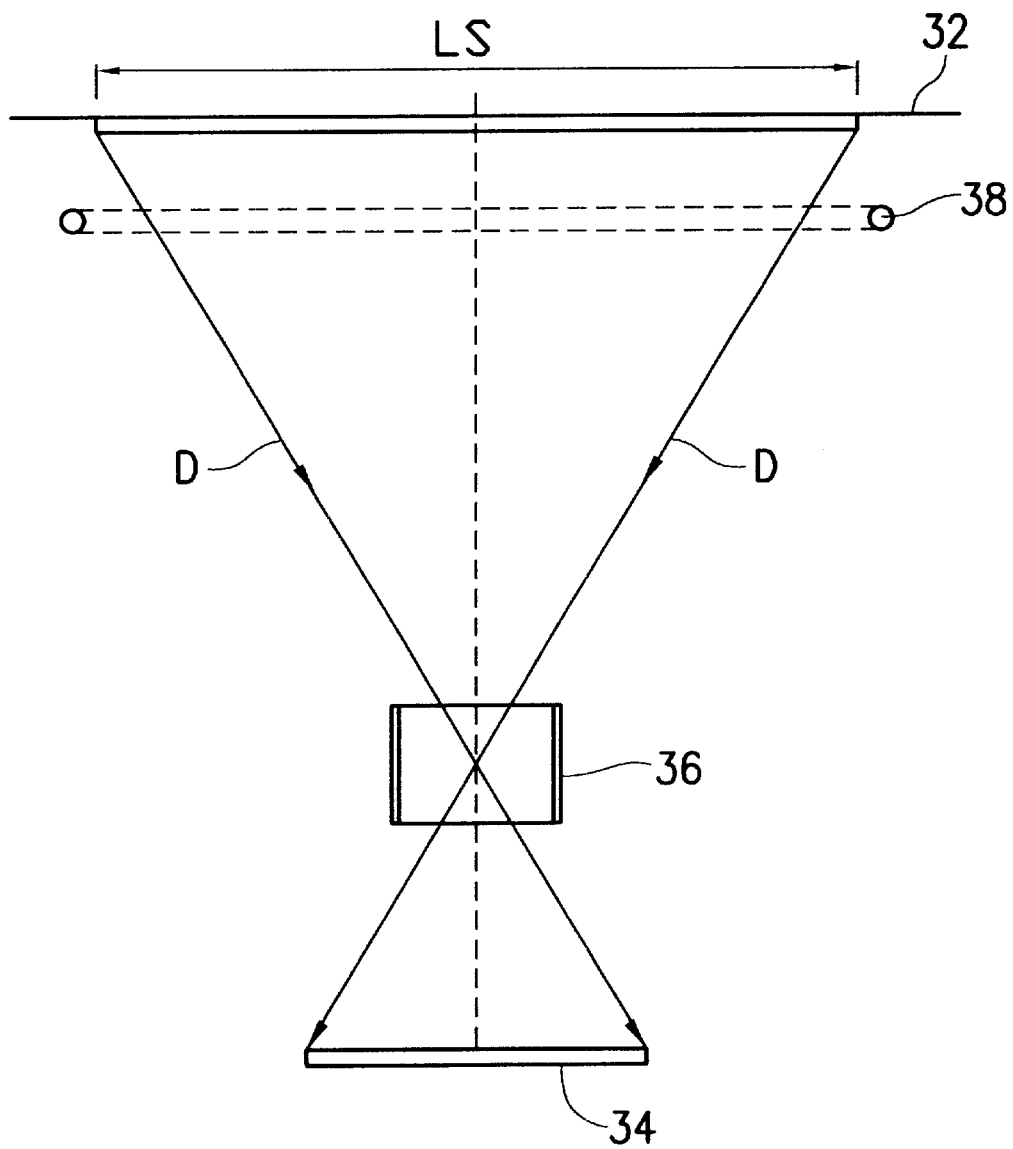
FIG. 4 shows an image-scanning device using the lighting tube depicted in FIG. 3(a) as a light-radiating device.
Figure 5:
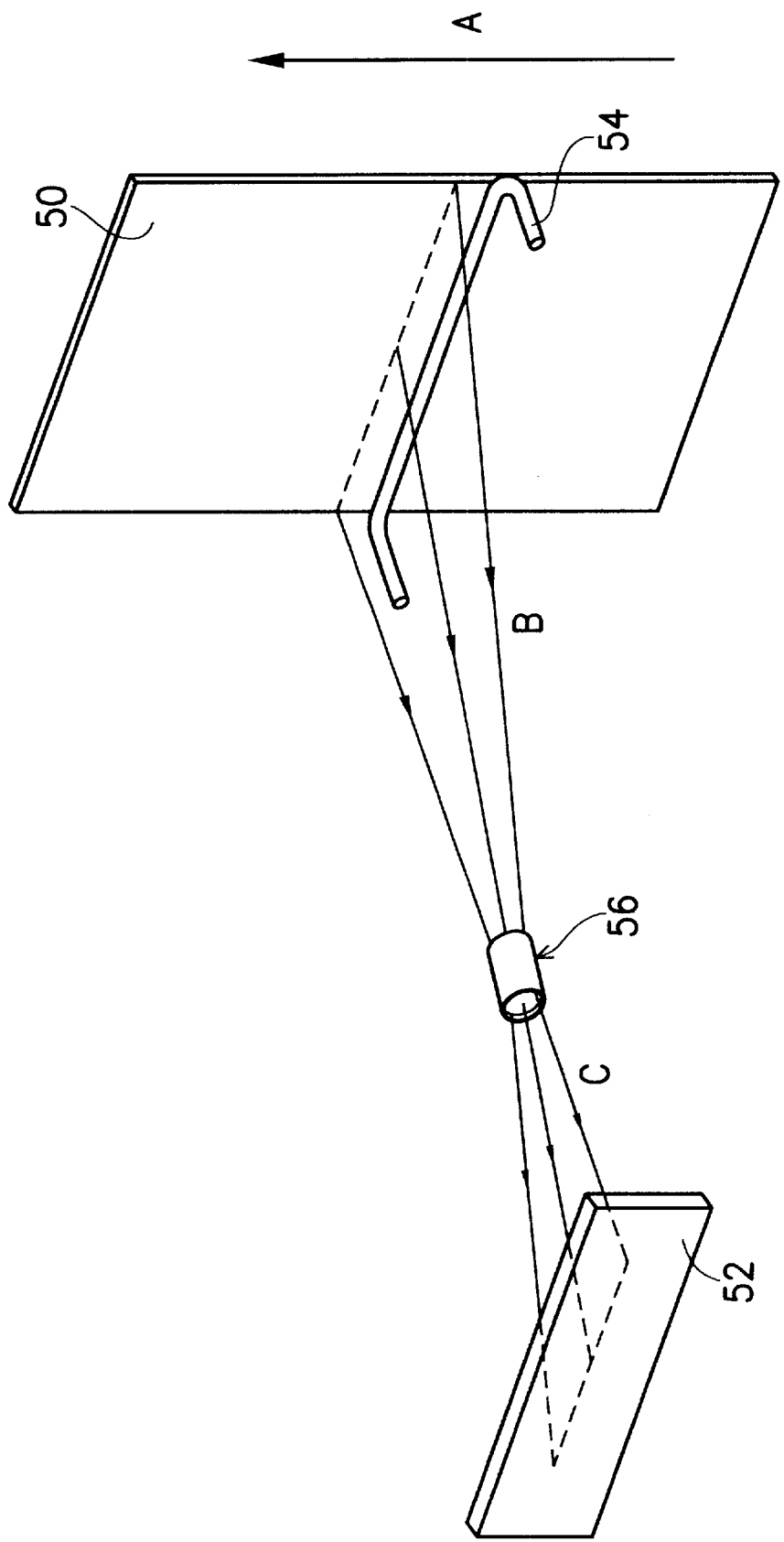
FIG. 5 shows the image-scanning module according to one preferred embodiment of the invention.
Figure 6:
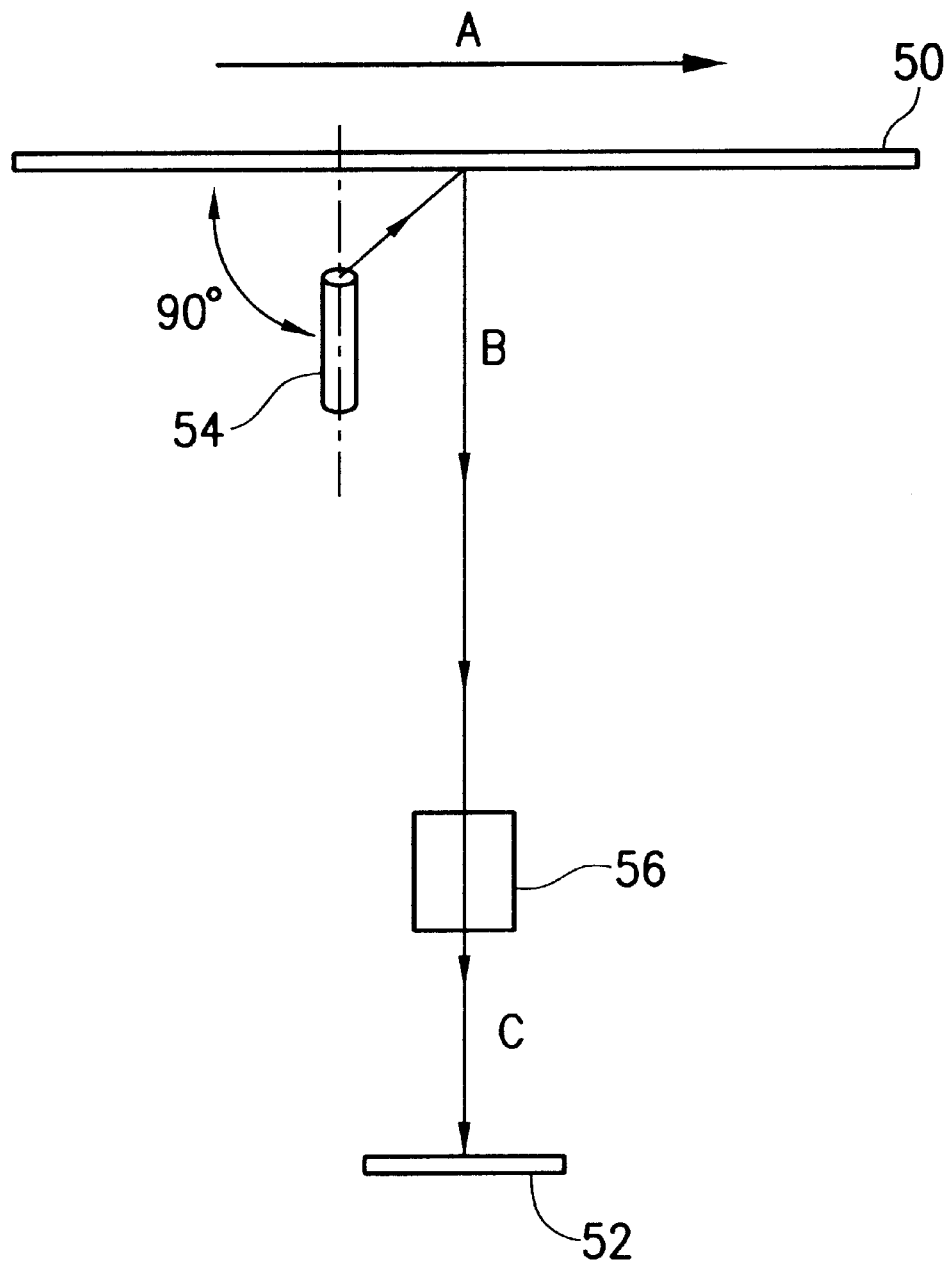
FIG. 6 shows the side view of the image-scanning module depicted in FIG. 5.
Figure 7:
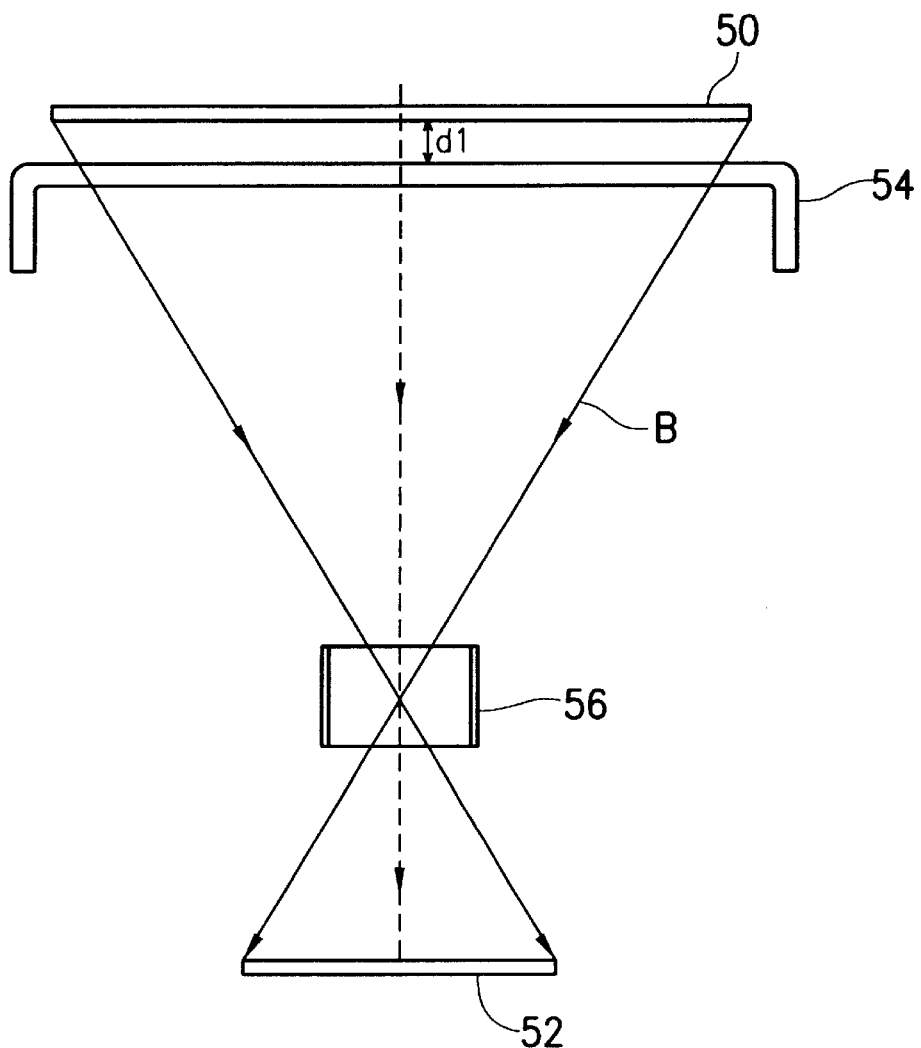
FIG. 7 shows the top view of the image-scanning module depicted in FIG. 5.

FIG. 5 shows the image-scanning module according to one preferred embodiment of the invention. FIG. 6 and FIG. 7 show the side view and top view of the image-scanning module depicted in FIG. 5, respectively. The image-scanning device is a scanner, for example.

Referring to FIG. 5, the image-scanning module has a light-radiating device 54 (lighting tube). The light-radiating device 54 moves with respect to a scanned object 50 which is, for example, a piece of paper or a picture, along a scanning path as indicated by arrow A. The scanned object 50 reflects the light emitted by the light-radiating device 54, as indicated by arrows B. The focusing-and-imaging device 56 then focuses an image of the reflected light onto the image-receiving device 52 as indicated by arrow C. For instance, the image-receiving device 52 may be a charge-coupled device (CCD).

The light-radiating device 54 may be a cold-cathode tube having a first lighting portion and two second lighting portions extended from two ends of the first lighting porting. The first lighting portion and the two second lighting portions are on the same plane. The light-radiating device 54 may have, for example, the shapes as depicted in FIG. 3(*a*)–FIG. 3(*d*). In this embodiment, the light-radiating device 54 used in the image-scanning module is a lighting tube and depicted in FIG. 3(*a*).

Referring to FIG. 6, it is quite clear that the light-radiating device 54 is disposed in a way that the plane formed by the first lighting portion and the two second lighting portions is perpendicular to the plane where the scanned object 50 is placed. Consequently, the reflected light path (depicted by arrow B) from the scanned object will not be masked by the two lighting portions. The length of first lighting portion can be reduced to approximate the width of the scanning line, thereby the scanner using the module can be downsized.

Figure 8:
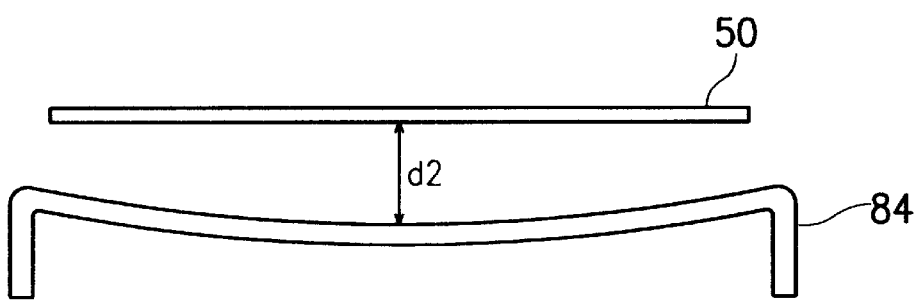
FIG. 8 shows a lighting tube.

Referring to FIG. 7, because the light-radiating device 54 is disposed perpendicular to the scanned object 50, the effect of compensating the luminance at the two ends of the first lighting portion by using the second lighting portions may degrade slightly. The luminance on the center of the scanned object may be greater than that on both ends of the light-radiating device 54, resulting in slightly uneven brightness on the scanned object. To eliminate the degradation, the first lighting portion of the light-radiating device 54 in FIG. 7 can be curved to form the light-radiating device 84 (lighting tube) depicted in FIG. 8. The distance ($d_2$) between the center region of the light-radiating device 84 and the scanned object 54 is greater than the distance ($d_1$) between the center region of the light-radiating device 54. The luminance is in reverse proportion to the square of distance. Therefore, when the light-radiating device 84 is used, the luminance on the center of the scanned object may approximate that on both ends of the light-radiating device 84 by appropriately adjusting the distance ($d_2$), thereby obtaining even brightness on the scanned object 50.

Similarly, the first lighting portions of the other lighting tubes (used as light-radiating devices) depicted in FIGS. 3(*b*)–3(*d*) also can be curved for obtaining more even brightness on the scanned object.

From above descriptions, the light-radiating device (lighting tube), examples of which are depicted in FIGS. 3(*a*)–3(*d*), is disposed perpendicular to the scanned object, whereby the second lighting portion for compensating luminance will not mask the reflected light path. Thus, the length of the light-radiating device can be decreased for downsizing the scanners. Moreover, the first lighting portion of the light-radiating device can be curved for obtaining more even brightness on the scanned object.

The image-scanning device is used for fabricating scanners. However, it is not limited to fabricating scanners, and can be applied to other image-scanning devices such as a facsimile machine and a copy machine, etc.

While the invention has been described by way of examples and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image-scanning module for a scanner at least comprising:

a light-radiating device for emitting light to scan an object, comprising a first lighting portion and two second lighting portions extended from two ends of the first lighting portion; wherein the first lighting portion and the two second lighting portions are on the same plane;

a focusing-and-imaging device for focusing the reflected light from said scanned object and for forming an image; and an image receiving device for receiving and processing said image;

wherein the light-radiating device is disposed in a way that the plane formed by the first lighting portion and the two second lighting portions is perpendicular to the plane where the scanned object is placed, whereby the reflected light from said scanned object is not masked by the two lighting portions and the length of first lighting portion can be reduced, thereby downsizing image-scanning devices using the image-scanning module.

2. The image-scanning module as claimed in claim 1, wherein the first lighting portion and the two second lighting portions are straight-line shaped, and each of the two second lighting portions is at a specific angle to the first lighting portion.

3. The image-scanning module as claimed in claim 1, wherein the first lighting portion is curve-shaped.

4. The image-scanning module as claimed in claim 1, wherein each of the two second lighting portions is U-shaped.

5. The image-scanning module as claimed in claim 1, wherein the two second lighting portions are used for compensating the luminance on two ends of the first lighting portion.

* * * * *